United States Patent
Curley (10) Patent No.: US 12,554,561 B2
(45) Date of Patent: Feb. 17, 2026

(54) SYSTEMS AND METHODS FOR GENERATING SYNTHETIC INFORMATION FOR APPLICATION PROGRAMMING INTERFACES USING ARTIFICIAL INTELLIGENCE

(71) Applicant: Capital One Services, LLC, McLean, VA (US)

(72) Inventor: Kathryn Curley, McLean, VA (US)

(73) Assignee: Capital One Services, LLC, McLean, VA (US)

(*) Notice: Subject to any disclaimer, the term of this patent is extended or adjusted under 35 U.S.C. 154(b) by 503 days.

(21) Appl. No.: 18/296,967

(22) Filed: Apr. 6, 2023

(65) Prior Publication Data

US 2024/0338264 A1    Oct. 10, 2024

(51) Int. Cl.
- *G06F 9/44* (2018.01)
- *G06F 9/54* (2006.01)
- *G06N 20/00* (2019.01)

(52) U.S. Cl.
CPC ............ *G06F 9/543* (2013.01); *G06N 20/00* (2019.01)

(58) Field of Classification Search
CPC ....................................................... G06F 9/543
USPC ........................................................... 719/320
See application file for complete search history.

(56) References Cited

U.S. PATENT DOCUMENTS

| | | | |
|---|---|---|---|
| 9,959,198 B1 * | 5/2018 | Jha | G06F 11/3698 |
| 11,030,082 B1 * | 6/2021 | Ma | G06F 11/3696 |
| 2022/0147633 A1 * | 5/2022 | Knox | G06F 21/57 |

* cited by examiner

*Primary Examiner* — Timothy A Mudrick
(74) *Attorney, Agent, or Firm* — Foley & Lardner LLP (57) ABSTRACT

The systems and methods use a centralized platform that allows users to store, search, and/or interact with assets. In particular, the systems and methods allow for the interaction with application programming interfaces ("APIs") during API development. For example, the systems and methods allow users to access and interact with request/response information (e.g., data contracts, error messages, API details, request/response details, etc.) for APIs within a single user interface and/or within the ecosystem of the data exchange.

20 Claims, 5 Drawing Sheets

SYSTEMS AND METHODS FOR GENERATING SYNTHETIC INFORMATION FOR APPLICATION PROGRAMMING INTERFACES USING ARTIFICIAL INTELLIGENCE

BACKGROUND

As the world increasingly moves toward the use of electronic storage as the predominant storage method, the amount and type of data in storage continues to expand. To manage this data, some systems rely on a data exchange. A data exchange may facilitate the process of sending, storing, and searching data.

SUMMARY

Data exchanges hold vast amounts of data in many different formats and platforms. Additionally, data exchange may provide asset descriptions and/or search functionality. However, as entities using data exchanges increasingly become more sophisticated, a need arises to expand the functionality of these data exchanges as well as leverage the functions of a data exchange beyond asset storage and into other technological realms. One such additional technological realm is application and/or software development.

Accordingly, the systems and methods described herein relate to expanding the use of conventional data exchanges and/or exchange functionality to include features and/or functions for application and/or software development. For example, the systems and methods recite the use of a centralized platform that allows users to store, search, and/or interact with assets. In particular, the systems and methods allow for the interaction with application programming interfaces ("APIs") during API development. For example, the systems and methods allow users to access and interact with request/response information (e.g., data contracts, error messages, API details, request/response details, etc.) for APIs within a single user interface and/or within the ecosystem of the data exchange. More specifically, the systems and methods add interactivity into data exchange menu/pages for APIs such that users may edit and/or submit sample requests to receive sample response data in real-time, as well as save changes to the data exchange (e.g., in a cURL format).

However, adding this functionality presents a novel technical problem. For example, in order to provide this interactivity, and in particular to allow users to edit, submit, and/or receive request/response information in real-time, the data exchange needs to have a corpus of valid, pre-built sample data from which to generate the request/response information. A conventional approach to such a problem would be to manually generate this data, but the process for obtaining this data, and ensuring it is high-quality, is complex and time-consuming. Additionally, manually generating this data may also require the data to be categorized and labeled accurately further exacerbating the time extensiveness of this task.

The systems and methods described herein overcome this technical hurdle by providing synthetically generated request/response information for APIs using artificial intelligence models, including, but not limited to, machine-learning, deep learning, etc. (referred to collectively herein as artificial intelligence models, machine-learning models, or simply, models). This synthetically generated request/response information may be specific to the APIs and/or may be accessible directly by a data exchange and/or its user interface. As such, the systems and methods may add the aforementioned interactivity into data exchanges by relying on this data.

However, the reliance on synthetically generated data creates yet another technical challenge. Specifically, the synthetically generated data needs to be generated in large quantities (e.g., in order to provide the request/response information with limited bias), be specific to a given API, and also needs to remain up-to-date. For example, APIs residing on the data exchange may require ongoing development and/or refinement that may extend over long time periods. In such cases, generated data produced at the beginning of a development cycle may be outdated while the development is ongoing. To complicate this problem, synthetically generating this data is a resource intensive process, thus continually re-generating data may strain computing resources. Similarly, the synthetically generated data may need to be unique for each API as the format, characteristics, and/or other content needed for useful request/response information may be particular to each API.

To overcome these technical challenges, yet provide the synthetically generated data that enables the aforementioned interactivity, the systems and methods generate the synthetically generated data using an artificial intelligence model that is trained on known pre-built test data and scheduled update data specific to a given API. That is, the system distinguishes between content types of the synthetically generated data to provide data that remains constant throughout the life cycle of the API development process as well as data that may be periodically updated. For example, the known pre-built test data may comprise user-generated content for seeding synthetically generated content for a specific API request/response sample. Additionally, the scheduled update data may comprise data synthetically generated at a predetermined schedule according to expected usage statistics for the first API request/response sample.

Working together, these two types of data ensure that synthetically generated data remains high-quality, but also remains up-to-date. For example, the known pre-built test data may comprise certain values, characteristics, and/or functions of synthetically generated data that remains static through the API development cycle, while the scheduled update data indicates certain values, categories of values, and/or functions that are updated (and/or updated in a specific manner such as at a predetermined time, based on a predetermined data source, etc.). As such, a portion of the synthetically generated data remains constant (and thus reusable over the API development cycle), while only another portion requires updates (e.g., limiting the strain computing resources).

In some aspects, systems and methods for providing synthetic request/response information for APIs through artificial intelligence are described. For example, the system may receive a first user action, at a user interface, requesting a first API request/response sample comprising a first user selected criterion, wherein the first API request/response sample is for a first API of a plurality of APIs. The system may determine, based on the first user selected criterion, a first content type for the first API request/response sample. The system may determine, based on the first content type, a first feature input. The system may input the first feature input into a first artificial intelligence model to generate a first output from the first artificial intelligence model, wherein the first output comprises synthetic response/request data for the first API, and wherein the first artificial intelligence model is trained on known pre-built test data and scheduled update data for the first API. The system may select a first subset of the synthetic response/request data for the first API from a plurality of subsets of the synthetic response/request data for the first APIs based on the first user selected criterion. The system may generate, at the user interface, the first API request/response sample based on the first subset of the synthetic response/request data for the first API.

Various other aspects, features, and advantages of the invention will be apparent through the detailed description of the invention and the drawings attached hereto. It is also to be understood that both the foregoing general description and the following detailed description are examples, and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art, that the embodiments of the invention may be practiced without these specific details or with an equivalent arrangement. In other cases, well-known structures and devices are shown in block diagram form in order to avoid unnecessarily obscuring the embodiments of the invention.

Figure 1:
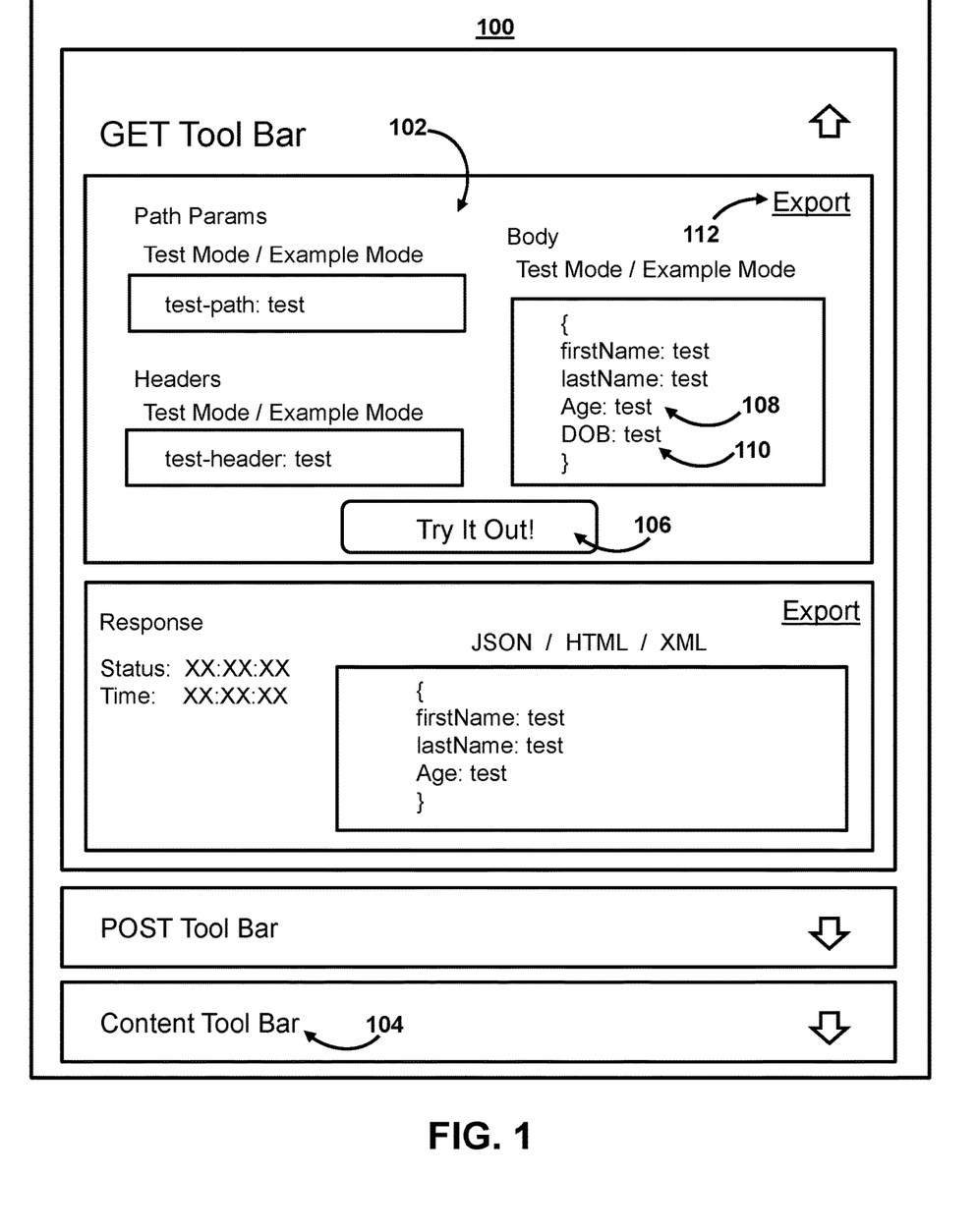
FIG. 1 shows an illustrative user interface for requesting synthetic request/response information for application programming interfaces ("APIs") through artificial intelligence, in accordance with one or more embodiments.

FIG. 1 shows an illustrative user interface for requesting synthetic request/response information for application programming interfaces ("APIs") through artificial intelligence, in accordance with one or more embodiments. In some embodiments, user interface 100 may comprise a user interface for accessing a comprehensive automation and support toolset for API design and development (e.g., referred to herein as "the system"). For example, user interface 100 represents an illustrative user interface for requesting API request/response samples based on user inputted criteria (e.g., entered into tab 102). As referred to herein, a "user interface" may comprise a human-computer interaction and communication in a device, and may include display screens, keyboards, a mouse, and the appearance of a desktop. For example, a user interface may comprise a way a user interacts with an application or a website. Furthermore, through user interface 100, the system may provide a cURL command-line tool for transferring data specified with URL syntax.

In some embodiments, user inputted criteria may comprise a criterion that may affect a qualitative or quantitative characteristic of an API request/response sample. For example, the user selected criteria may be selected by a user for a particular format of the sample, specific data in the sample, etc. The system may receive a user inputted criterion via user interface 100 (e.g., as entered in one or more fields in tab 102). The system may then generate an API request/response sample in response to selection of icon 106. Additionally, the API request/response sample may be exported into a different format in response to selection of icon 112.

For example, the system may be a tool used to address the challenges of sample design and development. The system may comprise a parameterized and integrated support toolset for API developers and/or consumers. The system may provide proactive checks on an ongoing basis, ensuring that API request/response samples are optimized, secured, and scalable. The system may provide this based on retrieving and utilizing data streamed (or otherwise transmitted in a continuous, real-time, and/or near-real-time, manner) from one or more databases accessible to the system. The system may provide an API request/response sample based on one or more artificial intelligence and/or artificial intelligence models (e.g., referred to collectively herein as "artificial intelligence models") with pattern matching algorithms based on API request/response information.

The system may comprise numerous components (e.g., as described in FIG. 3 below) to generate user interface 100. For example, the system may include one or more lambda functions (e.g., executed by control circuitry) to provide provision and data collection as well as reporting. The system may also include a machine-learning-based calculation and analysis engine used to optimize API request/response design. In some embodiments, the system may be built using a cloud-based approach and access a central repository. The central repository may receive and store usage statistics. The system may use these determinations to generate one or more API requests/responses related to API development.

As described herein, the API request/response samples may comprise requests and responses communicated by an API. The API may include a set of Hypertext Transfer Protocol (HTTP) request messages and a definition of the structure of response messages. The API may allow a software application, which is written against the API and installed on a client (such as, for example, a computing device associated with a dealer) to exchange data with a server (such as, for example, a computing system associated with a financial service provider) that implements the API, in a request-response pattern. In certain embodiments, the request-response pattern defined by the API may be configured in a synchronous fashion, and require that the response be provided in real-time. In some embodiments, a response message from the server to the client through the API consistent with the disclosed embodiments may be in the format including, for example, Extensible Markup Language (XML), JavaScript Object Notation (JSON), and/or the like.

In some embodiments, the API design may also designate specific request methods for a client to access the server. For example, the client may send GET, PUT, DELETE, and POST requests. The requests may contain parameters URL-encoded (e.g., GET) in the query string or form-encoded (e.g., POST) in the body (e.g., a form submission). Additionally or alternatively, the client may send requests with JSON serialized parameters in the body. Preferably, the requests with JSON serialized parameters use "application/json" content type. In another aspect, the API design may also require the server implementing the API to return messages in JSON format in response to the request calls from the client.

As referred to herein, an API request/response may provide any content. For example, the API request/response may comprise content selected by a user (e.g., based on one or more inputs). For example, the API request/response may be based on user inputted data 108 and/or user inputted data 110. The system may provide an API request/response based on existing usage statistics that are stored and analyzed by the system. For example, the system may receive (e.g., via user interface 100) one or more user selected criterion. The user selected criterion may comprise operational characteristics that indicate how a given API request/response will be used and/or what features, functions, or information it may provide. That is, the user selected criterion may comprise quantitative or qualitative characteristics about how the database is to be used, what features/functions it will support, and/or other expected usage characteristics (e.g., the number of tables, the number of concurrent users, the number of transactions per hour, the operation system, the application types, the security/compliance/privacy requirements, etc.).

As referred to herein, "content" should be understood to mean an electronically consumable user asset, such as internet content (e.g., streaming content, downloadable content, Webcasts, etc.), video clips, audio, content information, pictures, rotating images, documents, playlists, websites, articles, books, electronic books, blogs, advertisements, chat sessions, social media content, applications, games, and/or any other media or multimedia and/or combination of the same. Content may be recorded, played, displayed, or accessed by user devices, but can also be part of a live performance. Furthermore, user-generated content may include content created and/or consumed by a user. For example, user-generated content may include content created by another, but consumed and/or published by the user.

The system may monitor content generated by the user to generate an API profile. As referred to herein, "an API profile" and/or "API profile data" may comprise data actively and/or passively collected about an API and/or API request/response. For example, the API profile data may comprise content generated by the user and an API characteristic for the API. An API profile may be content consumed and/or created by a user for the API and/or API request/response.

API profile data may also include an API characteristic. As referred to herein, "an API characteristic" may include information about an API and/or information including a directory of stored API settings, preferences, compliance requirements, rule sets, plugin information, and/or other information used to generate the API request/response sample.

Based on this user selected criterion, the system may generate one or more content types to govern the sample design. The content types may be used to optimize in one or more characteristics for synthetically generated data for which the API request/responses may comprise. For example, the system may determine specific content types are optimized based on the expected needs of the API request/response (e.g., as entered by a user) and/or any additional rules sets or protocols triggered by the user selected criterion. For example, the user selected criterion may comprise known pre-built test data and scheduled update data for a first API of a plurality of APIs as entered via tab 104 and as further described in FIG. 2.

Figure 2:
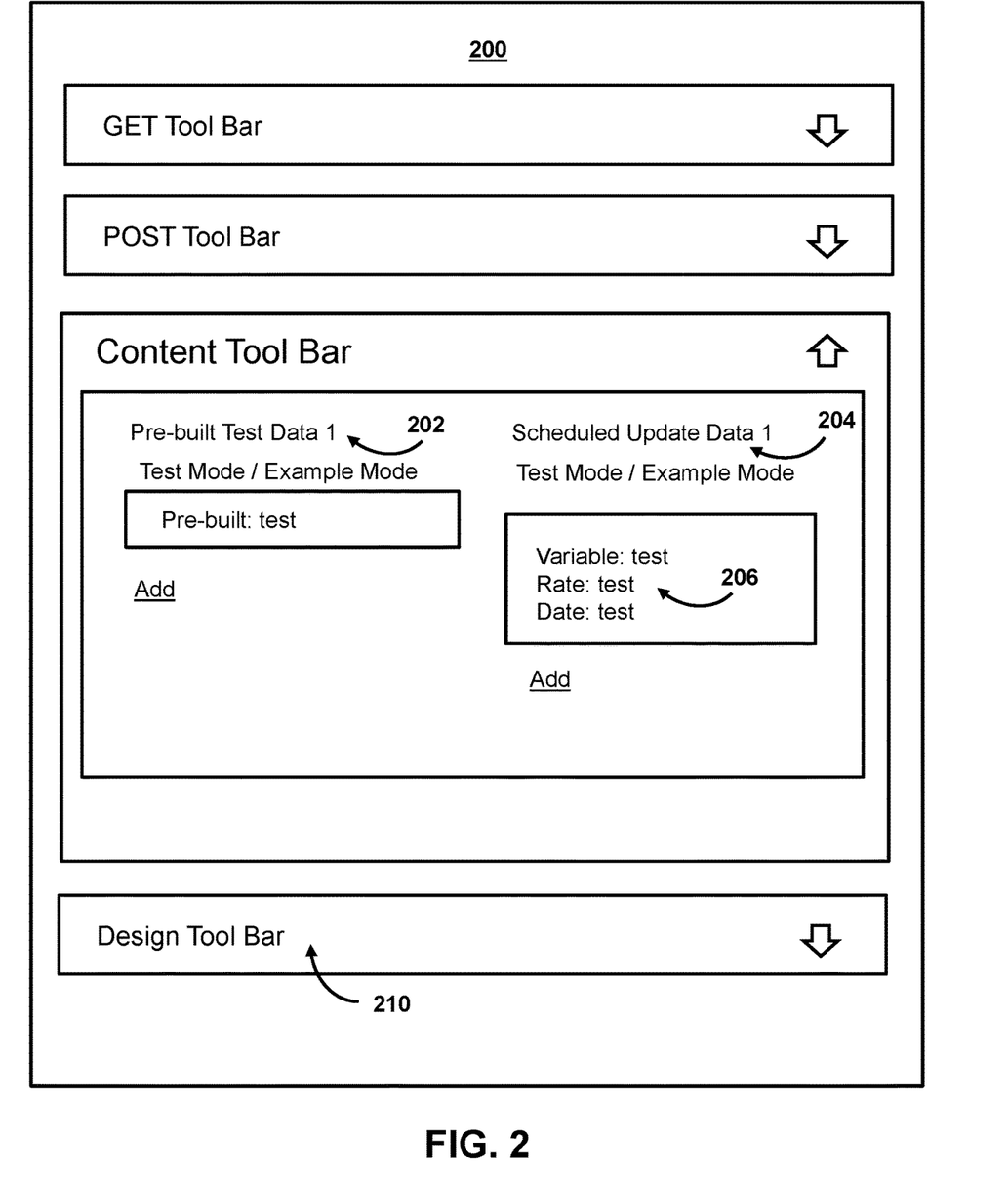
FIG. 2 shows an illustrative user interface for generating synthetic request/response information based on different content types, in accordance with one or more embodiments.

FIG. 2 shows an illustrative user interface for generating synthetic request/response information based on different content types, in accordance with one or more embodiments. For example, the user selected criterion may comprise pre-built test data and scheduled update data for a first API of a plurality of APIs as entered by a user (e.g., via tab 104 (FIG. 1)). As shown in FIG. 2, user interface 200 shows an exploded view of a content tool bar. For example, via user interface 200, the system may receive one or more characteristics for pre-built test data (e.g., data 202) as well as one or more characteristics for scheduled update data (e.g., data 204) and/or test data (e.g., data 206). The characteristics may then be populated in the API request/response sample.

As referred to herein, pre-built test data may refer to data that does not change with usage. For example, pre-built test data may comprise data stored in a data dictionary, a system catalog, and/or an information schema that depends on a user selection. Pre-built test data may be specific for one or more given applications, features, and/or functions. Additionally or alternatively, the pre-built test data may be specific to a sample design feature (e.g., as entered via tab 210). For example, pre-built test data may comprise user selected configuration content types (e.g., relational database service metadata or data dictionary schemas), object numbers and relationships, and/or security information (e.g., privileges, number of access accounts, password policies, etc.). That is, the pre-built test data may comprise data that is previously "built" or selected by a user and/or does not change automatically.

Scheduled update data may comprise data that changes (or changes automatically) over time and/or with usage. For example, scheduled update data may comprise data (e.g., a variable, function, feature, and/or other API request/response sample) that changes, such as the number of current users, information about users (e.g., date of birth, age, etc.), the number of current transaction requests, and/or usage statistics (e.g., CPU utilization percentage, available storage, freeable memory, writes per second, reads per second, etc.). For example, scheduled update data may comprise performance and resource utilization data that is available from one or more real-time network locations or services (e.g., pg views for PostgreSQL, v$ views for Oracle, sys schema for SQL Server, AWS CloudWatch). In some embodiments (e.g., as described in FIG. 5 below), the system may determine network locations for this information and automatically retrieve this information to generate a feature input for an artificial intelligence model, determine whether a recommendation should be made, and/or monitor the implementation of a recommendation.

In some embodiments, scheduled update data may be based on time-series data. As described herein, "time-series data" may include a sequence of data points that occur in successive order over some period of time. In some embodiments, time-series data may be contrasted with cross-sectional data, which captures a point-in-time. A time series can be taken on any variable that changes over time. The system may use a time series to track the variable (e.g., number of users) of an asset (e.g., API) over time.

The time-series data may also include data based on a time-series analysis. A time-series analysis may determine various trends such as a secular trend, which describe the movement along the term, a seasonal variation, which represent seasonal changes, cyclical fluctuations, which correspond to periodical but not seasonal variations, and irregular variations, which are other nonrandom sources of variations of a series. The system may maintain correlations for this data during modeling. In particular, the system may maintain correlations through non-normalization as normalizing data inherently changes the underlying data which may render correlations, if any, undetectable and/or lead to the detection of false positive correlations. For example, modeling techniques (and the predictions generated by them), such as rarefying (e.g., resampling as if each sample has the same total counts), total sum scaling (e.g., dividing counts by the sequencing depth), and others, and the performance of some strongly parametric approaches, depends heavily on the normalization choices. Thus, normalization may lead to lower model performance and more model errors. The use of a non-parametric bias test alleviates the need for normalization, while still allowing the methods and systems to determine a respective proportion of error detections for each of the plurality of time-series data component models. Through this unconventional arrangement and architecture, the limitations of the conventional systems are overcome. For example, non-parametric bias tests are robust to irregular distributions, while providing an allowance for covariate adjustment. Since no distributional assumptions are made, these tests may be applied to data that has been processed under any normalization strategy or not processed under a normalization process at all.

The time-series data may also include data based on a data stream. As referred to herein, "a data stream" may refer to data that is received from a data source that is indexed or archived by time. This may include streaming data (e.g., as found in streaming media files) or may refer to data that is received from one or more sources over time (e.g., either continuously or in a sporadic nature). A data stream segment may refer to a state or instance of the data stream. For example, a state or instance may refer to a current set of data corresponding to a given time increment or index value. For example, the system may receive time-series data as a data stream. A given increment (or instance) of the time-series data may correspond to a data stream segment.

For example, in response to receiving a user selected criterion that the API request/response sample may comprise a variable number of concurrent users, the system may optimize synthetically generated data based on this content type (i.e., scheduled update data). As such the scheduled update data may change over time, over uses, and/or based on current usage statistics. The system may update the synthetically generated data and/or the content of an API request/response sample accordingly. In another example, in response to a user selected criterion regarding an application that may house sensitive user information, the system may determine that a content type for that data (e.g., a security requirement) is static (e.g., the data comprises pre-built test data) and does not change. In another example, the system may update the synthetically generated data and/or the content of an API request/response sample such that a function and/or feature of the API request/response changes. For example, the API request/response sample may be based on updated pointers, triggers, file locations, and/or other hardware characteristics. For example, the system may receive information such as server statistics, record locations, etc. via one or more lambda functions.

The content defined by a content type may be varied. For example, the synthetically generated data and/or the content of an API request/response sample may comprise information on security of the API and/or protocol for implementing better security (e.g., security configurations, access control, and policy). In another example, synthetically generated data and/or the content of an API request/response sample may relate to compliance (e.g., reports on government compliance, privileged account access, functional account access, PCI (Payment Card Information)/NPI (Nonpublic Personal Information) data encryption and access, and Data Definition Language (DDL) related changes).

User interface 200 may also generate display data related to a design of synthetically generated data and/or the content of an API request/response sample. For example, via tab 210, user interface 200 (or the data therein) may be presented as a design page. The design page may include summary information about API development, affected systems/domains, responsible team members (e.g., analysis assigned to implement a recommendation), etc. The design page may also include queries that may be performed (e.g., queries based on progress, affected systems, milestones, governance, etc.). User interface 200 may also include a Gantt chart indicating progress for one or more tasks and sub-tasks, and it may provide filters and/or view changes. User interface 200 may also include analyst listings and metrics related to the API development.

The system may also provide one or more recommendations related to API development and design elements for APIs and/or API request/response samples. As referred to herein, a design element comprises a feature of an API and/or API request/response sample that distinguishes it from other APIs and/or API request/response samples. For example, a design element may comprise characteristics related to a schema, schema objects, indexes, tables (e.g., data tables, join tables, subset tables, validation tables), fields and columns, records and rows, keys (e.g., primary or foreign), relationships (e.g., One-to-One, One-to-Many, Many-to-One) and/or data types (e.g., alphanumeric, numeric, date and time). For example, characteristics of the schema may indicate a type of schema such as whether the API and/or API request/response sample follows a conceptual model, an internal model, or an external model. A conceptual model is a model which deals with organizational structures that are used to define structures such as tables and constraints. An internal model deals with the physical storage of the API and/or API request/response sample, as well as access to the data, such as through data storage in tables and the use of indexes to expedite data access. Notably, the internal model separates the physical requirements of the hardware and the operating system from the data model. An external model, or application interface, deals with methods through which users may access the schema, such as through the use of a data input form. The external model allows relationships to be created between the user application and the data model.

Figure 3:
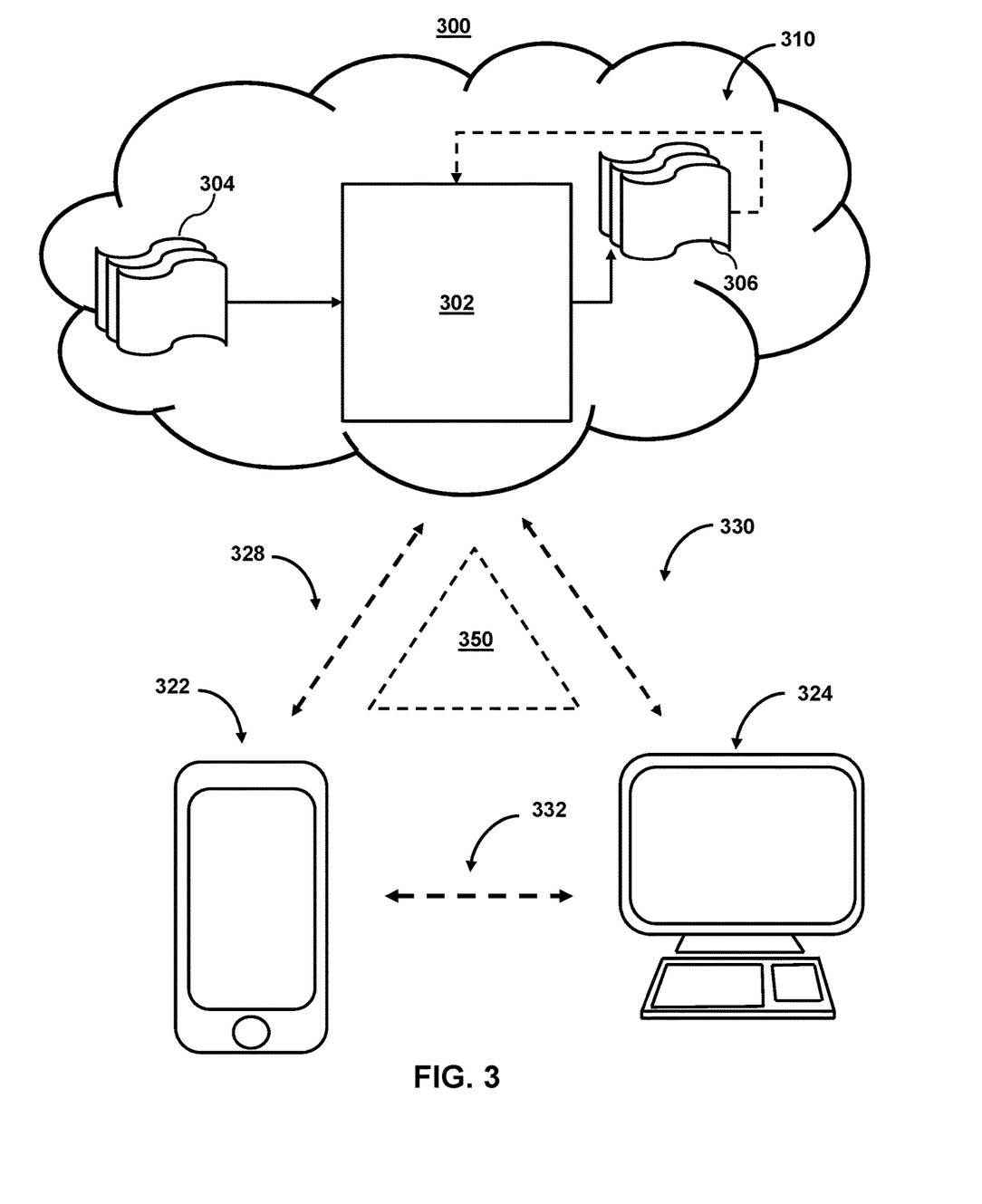
FIG. 3 shows illustrative system components for API request/response samples, in accordance with one or more embodiments.

FIG. 3 shows illustrative system components for API request/response samples, in accordance with one or more embodiments. For example, the system may represent the components used for monitoring data quality issues in non-native data over disparate computer networks, as shown in FIG. 1. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a handheld computer, or other computer equipment (e.g., a server), including "smart," wireless, wearable, and/or mobile devices. FIG. 3 also includes cloud components 310. Cloud components 310 may alternatively be any computing device as described above and may include any type of mobile terminal, fixed terminal, or other device. For example, cloud components 310 may be implemented as a cloud computing system and may feature one or more component devices. For example, cloud components 310 may house and/or enable user interface 100 (FIG. 1).

It should also be noted that system 300 is not limited to three devices. Users may, for instance, utilize one or more devices to interact with one another, one or more servers, or other components of system 300. It should be noted that, while one or more operations are described herein as being performed by particular components of system 300, those operations may, in some embodiments, be performed by other components of system 300. As an example, while one or more operations are described herein as being performed by components of mobile device 322, those operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (hereinafter "I/O") paths. Each of these devices may also include processors and/or control circuitry to send and receive commands, requests, and other suitable data using the I/O paths. For example, system 300 may include input/output circuitry configured to generate for display, on a user interface, the synthetically generated data and/or the content of an API request/response sample.

The control circuitry may comprise any suitable processing, storage, and/or input/output circuitry. Each of these devices may also include a user input interface and/or a user output interface (e.g., a display) for use in receiving and displaying data. For example, as shown in FIG. 3, both mobile device 322 and user terminal 324 include a display upon which to display data (e.g., user information, detected issues, recommendations, queries, and/or notifications). For example, system 300 may include control circuitry configured to monitor database development and/or scheduled update data.

Additionally, as mobile device 322 and user terminal 324 are shown as touchscreen smartphones, these displays also act as user input interfaces. It should be noted that in some embodiments, the devices may have neither user input interfaces nor displays and may instead receive and display content using another device (e.g., a dedicated display device such as a computer screen, and/or a dedicated input device such as a remote control, mouse, voice input, etc.). Additionally, the devices in system 300 may run an application (or another suitable program). The application may cause the processors and/or control circuitry to perform operations related to the synthetically generated data and/or the content of an API request/response sample as well as API development issues and/or generating recommendations related to usage statistics, scheduled update data, detected issues, queries, notifications, and/or the synthetically generated data and/or the content of an API request/response sample.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical discs, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein. For example, system 300 may include storage circuitry configured to store a model, wherein the model is trained to generate the synthetically generated data and/or the content of an API request/response sample.

FIG. 3 also includes communication paths 328, 330, and 332. Communication paths 328, 330, and 332 may include the internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communication paths, such as a satellite path, a fiber-optic path, a cable path, a path that supports internet communications (e.g., TCP/IP), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may be a database configured to store user information. For example, the database may include information that the system has collected about pre-built test data, scheduled update data, current or expected design elements, a data source, a recommendation, a criterion, and/or a historical pattern, both actively and passively. For example, the information may describe one or more characteristics of pre-built test data, scheduled update data, current or expected design elements, a data source, a recommendation, an issue, a recommendation, a criterion, and/or a historical pattern. Alternatively or additionally, the system may act as a clearinghouse for multiple sources of information. This information may be compiled into a user profile. Cloud components 310 may also include control circuitry configured to perform the various operations needed to generate recommendations. For example, the cloud components 310 may include cloud-based storage circuitry configured to generate recommendations. Cloud components 310 may also include cloud-based control circuitry configured to run processes to determine recommendations. Cloud components 310 may also include cloud-based input/output circuitry configured to display recommendations.

Cloud components 310 may include model 302, which may be an artificial intelligence model. Model 302 may take inputs 304 and provide outputs 306. The inputs may include multiple datasets, such as a training dataset and a test dataset. Each of the plurality of datasets (e.g., inputs 304) may include data subsets related to user data, predicted pre-built test and/or scheduled update data, and/or actual pre-built test or scheduled update data. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with known pre-built test data and/or scheduled update data for the first labeled feature input. The system may then train the first artificial intelligence model to classify the first labeled feature input with the known prediction (e.g., about content suitable for the synthetically generated data and/or the content of an API request/response sample).

In a variety of embodiments, model 302 may update its configurations (e.g., weights, biases, or other content types) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions (e.g., about content suitable for the synthetically generated data and/or the content of an API request/response sample).

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, backpropagation techniques may be utilized by model 302 where forward stimulation is used to reset weights on the "front" neural units. In some embodiments, stimulation and inhibition for model 302 may be more free flowing, with connections interacting in a more chaotic and complex fashion. During testing, an output layer of model 302 may indicate whether a given input corresponds to a classification of model 302.

In some embodiments, model 302 may predict a false positive recommendation (or that a recommendation is likely a false positive). For example, the system may determine that particular characteristics are more likely to be indicative of a prediction. In some embodiments, the model (e.g., model 302) may automatically perform actions based on outputs 306. In some embodiments, the model (e.g., model 302) may not perform any actions. The output of the model (e.g., model 302) may be used to generate for display, on a user interface, a content based on the false positive (or to determine not to generate the content).

System 300 also includes an application programming interface layer (e.g., API layer 350). API layer 350 may allow the system to generate content across different devices. In some embodiments, API layer 350 may be implemented on mobile device 322 or user terminal 324. Alternatively or additionally, API layer 350 may reside on one or more of cloud components 310. API layer 350 (which may be a REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of their operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful Web services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer, where microservices reside. In this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open-source API platforms and their modules. API layer 350 may use a developer portal. API layer 350 may use strong security constraints applying WAF and DDoS protection, and API layer 350 may use RESTful APIs as standard for external integration.

Figure 4:
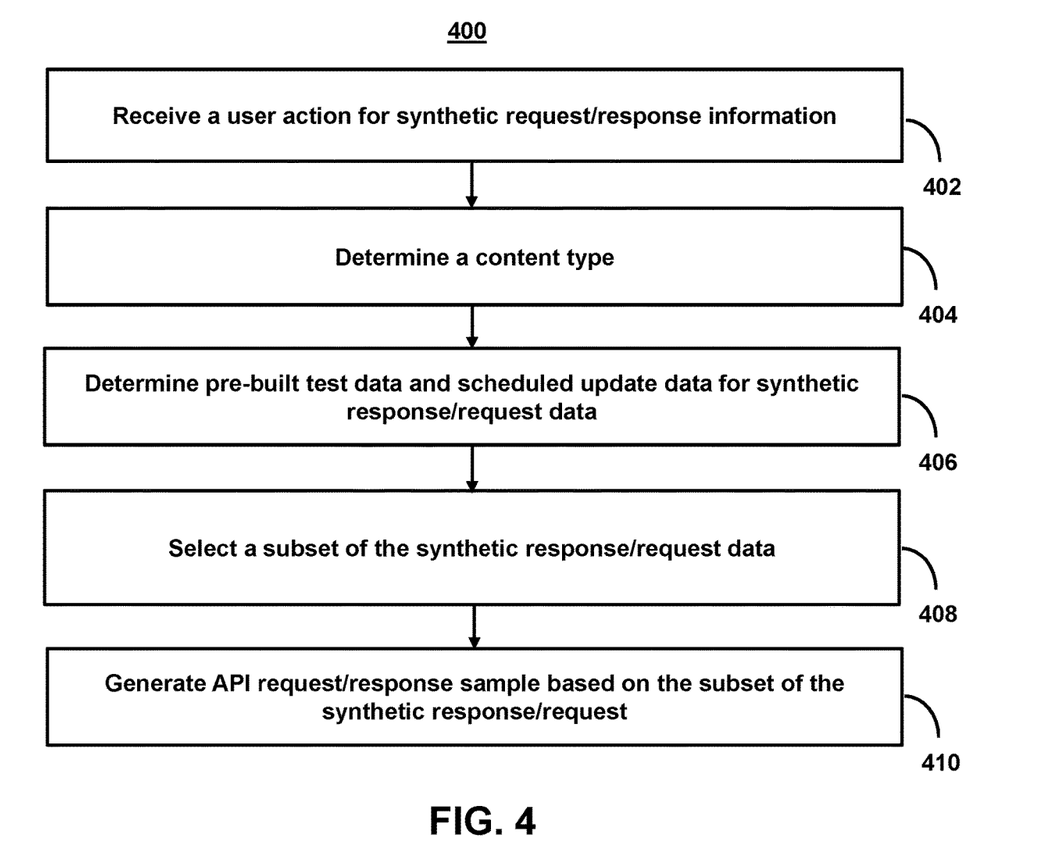
FIG. 4 shows a flowchart of the steps involved in providing synthetic request/response information for application programming interfaces ("APIs") through artificial intelligence, in accordance with one or more embodiments.

FIG. 4 shows a flowchart of the steps involved in providing synthetic request/response information for APIs through artificial intelligence, in accordance with one or more embodiments. For example, process 400 may represent the steps taken by one or more devices as shown in FIGS. 1-3 when providing API request/response samples. For example, the system may use user interface 100 (FIG. 1) to receive user selected criterion and then generate user interface 200 (FIG. 2) to provide API request/response samples.

At step 402, process 400 (e.g., using one or more components in system 300 (FIG. 3)) receives a first user action for synthetic request/response information. For example, the system may receive a first user action, at a user interface, requesting a first API request/response sample comprising a first user selected criterion.

For example, the system may receive one or more user selected criterion (e.g., via user interface 100 (FIG. 1)). Furthermore, the user selected criterion may be in a human-readable format and may use terminology consistent with that known to a user. This terminology may then be used by the system to determine specific content types for an API request/response sample. As the system performs the internal terminology conversion, the system allows a user to more easily and intuitively enter criteria. In some embodiments, the user selected criterion may comprise operational characteristics that indicate how a given database will be used and/or what features or functions it may provide.

At step 404, process 400 (e.g., using one or more components in system 300 (FIG. 3)) determines a first content type. For example, the system may determine, based on the first user selected criterion, a first content type for the first API request/response sample. For example, the content types may refer to optimizations in one or more sample goals. For example, the system may determine specific content types to optimize based on the expected needs of the sample (e.g., as entered by a user) and/or any additional rules sets or protocols triggered by the user selected criterion. These content types may refer to a predetermined list of optimizations that are automatically selected by the system based on the user selected criterion (e.g., user data, usage statistics such as computation, database performance, security, compliance, capacity planning, backup and recovery, and/or resilience). The pre-built test data may comprise data that is unlikely to change with use (e.g., features supported, compliance requirements, etc.), whereas the scheduled update data may comprise data that may change with use (e.g., usage statistics). That is, scheduled update data may comprise performance and resource utilization data that is available in dynamic views from one or more real-time network locations or services as described below in relation to FIG. 5.

By doing so, the system does not require a user (e.g., entering criteria) to have a deep knowledge of design criteria and/or system requirements. For example, the known pre-built test data may comprise user-generated content for seeding synthetically generated content for the first API request/response sample and the scheduled update data may comprise expected usage statistics for the first API request/response sample. The system may then determine a first content type based on the user-generated content for seeding synthetically generated content for the first API request/response sample and the expected usage statistics for the first API request/response sample.

In some embodiments, the scheduled update data may indicate an expiration date or time period of use for an API request/response sample and/or data for use in generating synthetically generated data. For example, the system may determine, based on the scheduled update data, an expiration date of content of the first API request/response sample and compare the expiration data to a current date.

At step 406, process 400 (e.g., using one or more components in system 300 (FIG. 3)) determines pre-built test data and scheduled update data for synthetic response/request data. For example, the system may determine, based on the first content type, pre-built test data and scheduled update data for synthetic response/request data for the first API. For example, in response to identifying pre-built test data (e.g., features supported by the API that are static and/or defined by the user) and scheduled update data (e.g., data that changes with use and/or time), the system may generate synthetic data comprising these properties.

In some embodiments, the system may generate the synthetic response/request data using artificial intelligence models. For example, the system may determine a first feature input. For example, the system may determine, based on the first content type, a first feature input. For example, when determining the first subset of pre-built test and scheduled update training data for generating the first feature input, the system may filter available training data based on the known pre-built test data to generate a filtered dataset. The system may then retrieve labeled scheduled update data corresponding to the filtered dataset. The labeled dataset may comprise current usage statistics for a sample having given content. The system may then use this data to optimize a given content type. In some embodiments, retrieving the scheduled update data corresponding to the filtered dataset further may comprise determining a network location, on the network, comprising the labeled scheduled update data, generating a query for retrieving the labeled scheduled update data, and automatically retrieving, based on the query, the labeled scheduled update data from the network location.

In some embodiments, the system may verify that the data is recent and/or up-to-date. For example, the system may determine an update period for a network location comprising the labeled scheduled update data, compare the update period to a threshold update period, and retrieve the labeled scheduled update data in response to the update period corresponding to the threshold update period.

For example, the system may input the first feature input into a first artificial intelligence model to generate a first output from the first artificial intelligence model, wherein the first output comprises synthetic response/request data for the first API, and wherein the first artificial intelligence model is trained on known pre-built test data and scheduled update data for the first API of a plurality of APIs. For example, the system may generate feature input that comprises arrays of data that may be processed by an artificial intelligence model.

In some embodiments, the system may select a given artificial intelligence model (e.g., an artificial intelligence model having particular architecture) based on the content type to be optimized. For example, the artificial intelligence model may detect patterns within the labeled training data subset. The model that is selected and the training considerations may depend on one or more factors determined by the system. For example, when determining the data points, feature input matrix, and/or model training considerations, the system may determine minimal data required (e.g., regular running cycles, peak operations, availability events, and/or other requirements), prediction vs. recommendation accuracy (and may adjust a recommendation based on learning accuracy), and the size and composition of training data sets vs. testing sets (e.g., how the data is split, collected, and used in training and testing). In such cases, the system may determine, based on the first content type, a first model criterion for the first API request/response sample. The system may then select the first artificial intelligence model from a plurality of artificial intelligence models based on the first model criterion.

At step 408, process 400 (e.g., using one or more components in system 300 (FIG. 3)) selects a first subset of the synthetic response/request data for the first API. For example, the system may select a first subset of the synthetic response/request data for the first API from a plurality of subsets of the synthetic response/request data for the first APIs based on the first user selected criterion.

At step 410, process 400 (e.g., using one or more components in system 300 (FIG. 3)) generates a first API request/response sample. For example, the system may generate, at the user interface, the first API request/response sample based on the first subset of the synthetic response/request data for the first API. In some embodiments, the system may provide expected usage statistics. The system may also provide supplemental data about the implementation of an update.

In some embodiments, the system may continue to monitor pre-built test and/or scheduled update data after implementing. For example, the system may monitor APIs to determine whether the current (or actual) pre-built test and/or scheduled update data corresponds to the expected pre-built test and/or scheduled update data as well as the user selected criterion. If the system determines that it does not (e.g., usage or variable (e.g., date range) is within a threshold difference and/or a feature or function is not being used), the system may recommend a change. For example, the system may make a subsequent recommendation based on the update information. Additionally or alternatively, the system may request (or monitor for) new user selected criterion (or provide recommendations for a new user selected criterion).

For example, the system may, after generating the first API request/response sample, receive a second user action, at the user interface, requesting a second API request/response sample based on second user selected criterion, wherein the second API request/response sample is for a second API of the plurality of APIs. The system may determine, based on the second user selected criterion, a second content type for the second API request/response sample. The system may determine, based on the second content type, a second subset of pre-built test and scheduled update training data for generating a second feature input. The system may input the second feature input into a second artificial intelligence model to generate a second output from the second artificial intelligence model. The system may select a second subset of the synthetic response/request data for the first API from the plurality of subsets of the synthetic response/request data for the first APIs based on the second output. The system may generate, at the user interface, the second API request/response sample based on the second subset of the synthetic response/request data for the first API.

It is contemplated that the steps or descriptions in FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the devices or equipment discussed in relation to FIGS. 1-3 could be used to perform one or more of the steps in FIG. 4.

Figure 5:
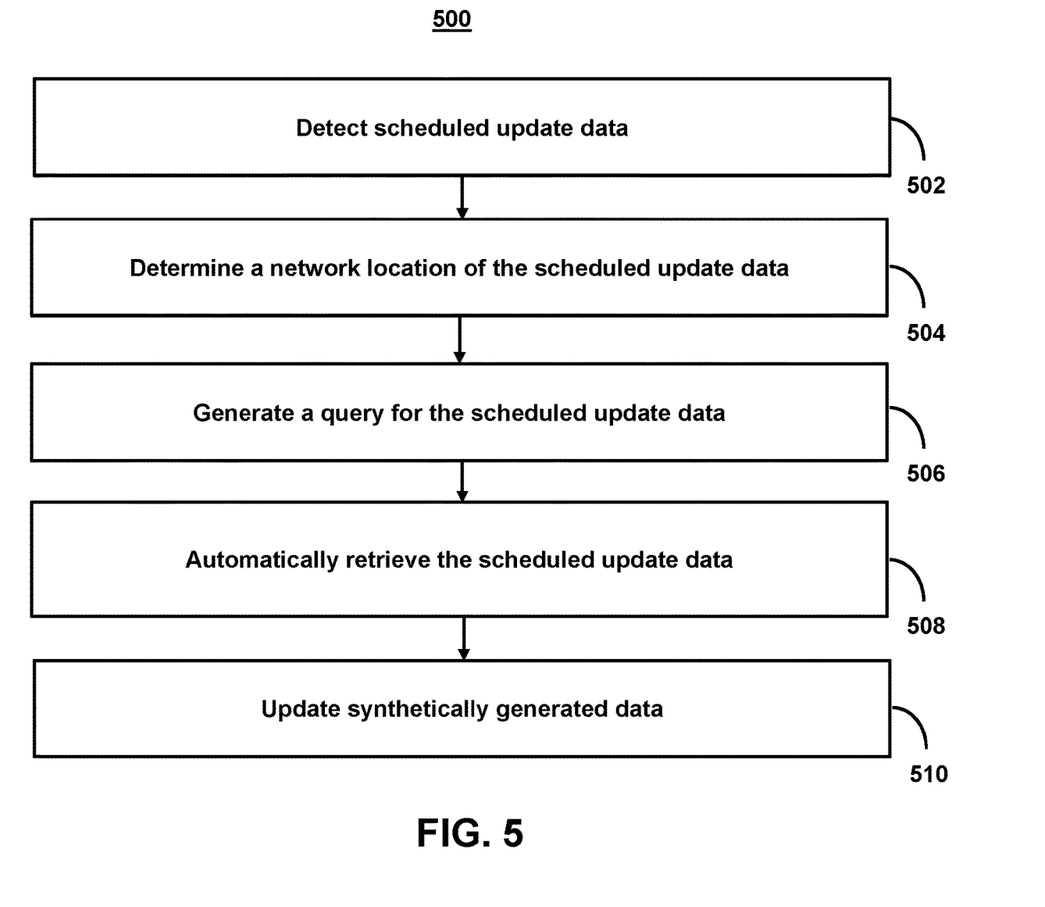
FIG. 5 shows a flowchart of the steps involved in retrieving scheduled update data related to API request/response samples, in accordance with one or more embodiments.

FIG. 5 shows a flowchart of the steps involved in retrieving scheduled update data related to API request/response samples, in accordance with one or more embodiments. For example, process 500 may represent the steps taken by one or more devices, as shown in FIGS. 1-3, when retrieving scheduled update data for generating a feature input, monitoring current usage, and/or predicting expected usage for generating synthetically generated data. For example, the system may locate information, determine a network pathway to quickly and efficiently retrieve this information, and/or pre-fetch this information.

For example, the system may determine the scheduled update data corresponding to a refresh rate of the first API request/response sample. The system may determine a network location, on the network, comprising the scheduled update data. The system may generate a query for retrieving the scheduled update data. The system may automatically retrieve, based on the query, the scheduled update data from the network location. The system may generate, at the user interface, the scheduled update data.

At step 502, process 500 (e.g., using one or more components in system 300 (FIG. 3)) detects scheduled update data. For example, the system may detect schedule update data corresponding to an API or API request/response sample. For example, the system may detect the scheduled update data in response to a user input to a user interface (e.g., user interface 200 (FIG. 2)). In some embodiments, the system may retrieve usage statistics from an API or API request/response sample. In some embodiments, the system may, in response to a user query or triggered based on ongoing monitoring, generate, at a user interface, a request to update one or more variables for an API request/response sample.

At step 504, process 500 (e.g., using one or more components in system 300 (FIG. 3)) determines a network location of the scheduled update data and/or data related to the scheduled update data. For example, the system may determine a network location of the scheduled update data across a computer network. In some embodiments, a network location may be a profile that includes a collection of network and sharing settings that are applied to the network the system is connected to, including user settings, authorizations, user information access restrictions, data source availability, etc. Based on the network location assigned to the system's active network connection, features such as information retrieval, network discovery, etc., may be enabled or disabled.

In some embodiments, the system may retrieve labeled data (e.g., data indicating current usage in an API and/or API request/response samples). The system may retrieve the labeled scheduled update data corresponding to a filtered dataset further by querying a metadata retrieval layer and generating a common function call using the metadata retrieval layer. By using the common function call, the system may communicate with numerous devices (and databases) along the network.

At step 506, process 500 (e.g., using one or more components in system 300 (FIG. 3)) generates a query for the scheduled update data. For example, the system may generate a network pathway (e.g., on the network associated with a data source of the monitored data entries) to the scheduled update data and transmit a query for the scheduled update data. In some embodiments, the system may open a session with a source of the scheduled update data to retrieve a real-time stream of the data. For example, the system may generate one or more network pathways based on correlation-based network analysis combined with machine-learning techniques. For example, the system may use artificial intelligence (e.g., as described in FIG. 3 above) to select a path for traffic in a network or between or across multiple networks. The system may traverse and/or process information for numerous types of networks, including circuitswitched networks, such as the public switched telephone network (PSTN), and computer networks, such as the internet.

At step 508, process 500 (e.g., using one or more components in system 300 (FIG. 3)) automatically retrieves the scheduled update data (or data referenced by the scheduled update data) from the network location. For example, the system may automatically retrieve the scheduled update data from the network location in response to detecting the scheduled update data.

At step 510, process 500 (e.g., using one or more components in system 300 (FIG. 3)) updates synthetically generated data based on the scheduled update data (or data referenced by the scheduled update data). For example, the system may detect that one or more variables in synthetically generated data and/or data in an API request/response sample that is subject to a scheduled update and replace and/or modify that data.

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order, in parallel, or simultaneously to reduce lag or increase the speed of the system or method. Furthermore, it should be noted that any of the devices or equipment discussed in relation to FIGS. 1-3 could be used to perform one or more of the steps in FIG. 5.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for providing synthetic request/response information for application programming interfaces ("APIs") through artificial intelligence.
2. The method of the preceding embodiment, further comprising: receiving a first user action, at a user interface, requesting a first API request/response sample comprising a first user selected criterion, wherein the first API request/response sample is for a first API of a plurality of APIs; determining, based on the first user selected criterion, a first content type for the first API request/response sample; determining, based on the first content type, pre-built test data and scheduled update data for synthetic response/request data for the first API; selecting a first subset of the synthetic response/request data for the first API from a plurality of subsets of the synthetic response/request data for the first API based on the first user selected criterion; and generating, at the user interface, the first API request/response sample based on the first subset of the synthetic response/request data for the first API.
3. The method of any one of the preceding embodiments, wherein determining, based on the first content type, the pre-built test data and the scheduled update data for the first API further comprises: inputting a first feature input into a first artificial intelligence model to generate a first output from the first artificial intelligence model, wherein the first output comprises the synthetic response/request data for the first API.
4. The method of any one of the preceding embodiments, wherein the operations further comprise: receiving a second user action, at the user interface, requesting a second API request/response sample based on second user selected criterion, wherein the second API request/response sample is for a second API of the plurality of APIs; determining, based on the second user selected criterion, a second content type for the second API request/response sample; determining, based on the second content type, a second subset of pre-built test and scheduled update training data for generating a second feature input; inputting the second feature input into a second artificial intelligence model to generate a second subset of the synthetic response/request data; and generating, at the user interface, the second API request/response sample based on the second subset of the synthetic response/request data.
5. The method of any one of the preceding embodiments, further comprising: determining, based on the first content type, a first model criterion for the first API request/response sample; and selecting the first artificial intelligence model from a plurality of artificial intelligence models based on the first model criterion.
6. The method of any one of the preceding embodiments, wherein determining the first subset of pre-built test and scheduled update training data for generating the first feature input comprises: filtering available training data based on the known pre-built test data to generate a filtered dataset; and retrieving labeled scheduled update data corresponding to the filtered dataset.
7. The method of any one of the preceding embodiments, wherein retrieving the labeled scheduled update data corresponding to the filtered dataset further comprises: querying a metadata retrieval layer; and generating a common function call using the metadata retrieval layer.
8. The method of any one of the preceding embodiments, further comprising: determining the scheduled update data corresponding to a refresh rate of the first API request/response sample; determining a network location, on a network, comprising the scheduled update data; generating, based on the refresh rate, a query for retrieving the scheduled update data; automatically retrieving, based on the query, the scheduled update data from the network location; and generating, at the user interface, the scheduled update data.
9. The method of any one of the preceding embodiments, wherein the pre-built test data comprises user-generated content for seeding synthetically generated content for the first API request/response sample and the scheduled update data comprises data synthetically generated at a predetermined schedule accordingly to expected usage statistics for the first API request/response sample.
10. The method of any one of the preceding embodiments, further comprising: determining, based on the scheduled update data, an expiration date of content of the first API request/response sample; and comparing the expiration data to a current date.
11. The method of any one of the preceding embodiments, wherein determining the first subset of pre-built test and scheduled update training data for generating the first feature input comprises: filtering available training data based on the pre-built test data to generate a filtered dataset; and retrieving labeled scheduled update data corresponding to the filtered dataset.

12. The method of any one of the preceding embodiments, wherein retrieving the labeled scheduled update data corresponding to the filtered dataset further comprises: querying a metadata retrieval layer; and generating a common function call using the metadata retrieval layer.

13. The method of any one of the preceding embodiments, wherein retrieving the labeled scheduled update data corresponding to the filtered dataset further comprises: determining a network location, on a network, comprising the labeled scheduled update data; generating a query for retrieving the labeled scheduled update data; and automatically retrieving, based on the query, the labeled scheduled update data from the network location.

14. The method of any one of the preceding embodiments, wherein retrieving the labeled scheduled update data corresponding to the filtered dataset further comprises: determining an update period for a network location comprising the labeled scheduled update data; comparing the update period to a threshold update period; and retrieving the labeled scheduled update data in response to the update period corresponding to the threshold update period.

15. A tangible, non-transitory, machine-readable medium storing instructions that, when executed by a data processing apparatus, cause the data processing apparatus to perform operations comprising those of any of embodiments 1-14.

16. A system comprising: one or more processors and memory storing instructions that, when executed by the processors, cause the processors to effectuate operations comprising those of any of embodiments 1-14.

17. A system comprising means for performing any of embodiments 1-14.

What is claimed is:

1. A system for providing synthetic request/response information for application programming interfaces ("APIs") through artificial intelligence, the system comprising:
one or more processors; and
a non-transitory, computer-readable medium comprising instructions recorded thereon that when executed by the one or more processors cause operations comprising:
receiving a first user action, at a user interface, requesting a first API request/response sample comprising a first user selected criterion, wherein the first API request/response sample is for a first API of a plurality of APIs;
determining, based on the first user selected criterion, a first content type for the first API request/response sample;
determining, based on the first content type, a first feature input;
inputting the first feature input into a first artificial intelligence model to generate a first output from the first artificial intelligence model, wherein the first output comprises synthetic response/request data for the first API, and wherein the first artificial intelligence model is trained on pre-built test data and scheduled update data for the first API, wherein the pre-built test data comprises user-generated content for seeding synthetically generated content for the first API request/response sample and the scheduled update data comprises data synthetically generated at a predetermined schedule accordingly to expected usage statistics for the first API request/response sample;
selecting a first subset of the synthetic response/request data for the first API from a plurality of subsets of the synthetic response/request data for the first API based on the first user selected criterion; and
generating, at the user interface, the first API request/response sample based on the first subset of the synthetic response/request data for the first API.

2. A method for providing synthetic request/response information for application programming interfaces ("APIs") through artificial intelligence, the method comprising:
receiving a first user action, at a user interface, requesting a first API request/response sample comprising a first user selected criterion, wherein the first API request/response sample is for a first API of a plurality of APIs;
determining, based on the first user selected criterion, a first content type for the first API request/response sample;
determining, based on the first content type, a first feature input;
inputting the first feature input into a first artificial intelligence model to generate a first output from the first artificial intelligence model, wherein the first output comprises synthetic response/request data for the first API, and wherein the first artificial intelligence model is trained on pre-built test data and scheduled update data for the first API;
selecting a first subset of the synthetic response/request data for the first API from a plurality of subsets of the synthetic response/request data for the first API based on the first user selected criterion; and
generating, at the user interface, the first API request/response sample based on the first subset of the synthetic response/request data for the first API.

3. The method of claim 2, further comprising:
receiving a second user action, at the user interface, requesting a second API request/response sample based on second user selected criterion, wherein the second API request/response sample is for a second API of the plurality of APIs;
determining, based on the second user selected criterion, a second content type for the second API request/response sample;
determining, based on the second content type, a second subset of pre-built test and scheduled update training data for generating a second feature input;
inputting the second feature input into a second artificial intelligence model to generate a second subset of the synthetic response/request data; and
generating, at the user interface, the second API request/response sample based on the second subset of the synthetic response/request data.

4. The method of claim 2, further comprising:
determining, based on the first content type, a first model criterion for the first API request/response sample; and
selecting the first artificial intelligence model from a plurality of artificial intelligence models based on the first model criterion.

5. The method of claim 2, further comprising:
determining the scheduled update data corresponding to a refresh rate of the first API request/response sample;

determining a network location, on a network, comprising the scheduled update data;
generating, based on the refresh rate, a query for retrieving the scheduled update data;
automatically retrieving, based on the query, the scheduled update data from the network location; and
generating, at the user interface, the scheduled update data.

6. The method of claim 2, wherein the pre-built test data comprises user-generated content for seeding synthetically generated content for the first API request/response sample and the scheduled update data comprises data synthetically generated at a predetermined schedule according to expected usage statistics for the first API request/response sample.

7. The method of claim 2, further comprising:
determining, based on the scheduled update data, an expiration date of content of the first API request/response sample; and
comparing the expiration data to a current date.

8. The method of claim 2, wherein determining the first subset of pre-built test and scheduled update training data for generating the first feature input comprises:
filtering available training data based on the pre-built test data to generate a filtered dataset; and
retrieving labeled scheduled update data corresponding to the filtered dataset.

9. The method of claim 8, wherein retrieving the labeled scheduled update data corresponding to the filtered dataset further comprises:
querying a metadata retrieval layer; and
generating a common function call using the metadata retrieval layer.

10. The method of claim 8, wherein retrieving the labeled scheduled update data corresponding to the filtered dataset further comprises:
determining a network location, on a network, comprising the labeled scheduled update data;
generating a query for retrieving the labeled scheduled update data; and
automatically retrieving, based on the query, the labeled scheduled update data from the network location.

11. The method of claim 8, wherein retrieving the labeled scheduled update data corresponding to the filtered dataset further comprises:
determining an update period for a network location comprising the labeled scheduled update data;
comparing the update period to a threshold update period; and
retrieving the labeled scheduled update data in response to the update period corresponding to the threshold update period.

12. A non-transitory, computer-readable medium comprising instructions that when executed by one or more processors cause operations comprising:
receiving a first user action, at a user interface, requesting a first API request/response sample comprising a first user selected criterion, wherein the first API request/response sample is for a first API of a plurality of APIs;
determining, based on the first user selected criterion, a first content type for the first API request/response sample;
determining, based on the first content type, pre-built test data and scheduled update data for synthetic response/request data for the first API;
selecting a first subset of the synthetic response/request data for the first API from a plurality of subsets of the synthetic response/request data for the first API based on the first user selected criterion; and
generating, at the user interface, the first API request/response sample based on the first subset of the synthetic response/request data for the first API.

13. The non-transitory, computer-readable medium of claim 12, wherein determining, based on the first content type, the pre-built test data and the scheduled update data for the first API further comprises:
inputting a first feature input into a first artificial intelligence model to generate a first output from the first artificial intelligence model, wherein the first output comprises the synthetic response/request data for the first API.

14. The non-transitory, computer-readable medium of claim 13, wherein the operations further comprise:
receiving a second user action, at the user interface, requesting a second API request/response sample based on second user selected criterion, wherein the second API request/response sample is for a second API of the plurality of APIs;
determining, based on the second user selected criterion, a second content type for the second API request/response sample;
determining, based on the second content type, a second subset of pre-built test and scheduled update training data for generating a second feature input;
inputting the second feature input into a second artificial intelligence model to generate a second subset of the synthetic response/request data; and
generating, at the user interface, the second API request/response sample based on the second subset of the synthetic response/request data.

15. The non-transitory, computer-readable medium of claim 13, wherein the operations further comprise:
determining, based on the first content type, a first model criterion for the first API request/response sample; and
selecting the first artificial intelligence model from a plurality of artificial intelligence models based on the first model criterion.

16. The non-transitory, computer-readable medium of claim 13, wherein determining the first subset of pre-built test and scheduled update training data for generating the first feature input comprises:
filtering available training data based on the known pre-built test data to generate a filtered dataset; and
retrieving labeled scheduled update data corresponding to the filtered dataset.

17. The non-transitory, computer-readable medium of claim 16, wherein retrieving the labeled scheduled update data corresponding to the filtered dataset further comprises:
querying a metadata retrieval layer; and
generating a common function call using the metadata retrieval layer.

18. The non-transitory, computer-readable medium of claim 12, wherein the operations further comprise:
determining the scheduled update data corresponding to a refresh rate of the first API request/response sample;
determining a network location, on a network, comprising the scheduled update data;
generating, based on the refresh rate, a query for retrieving the scheduled update data;
automatically retrieving, based on the query, the scheduled update data from the network location; and
generating, at the user interface, the scheduled update data.

19. The non-transitory, computer-readable medium of claim 12, wherein the pre-built test data comprises user-generated content for seeding synthetically generated content for the first API request/response sample and the scheduled update data comprises data synthetically generated at a predetermined schedule accordingly to expected usage statistics for the first API request/response sample.

20. The non-transitory, computer-readable medium of claim 12, further comprising:
   determining, based on the scheduled update data, an expiration date of content of the first API request/response sample; and
   comparing the expiration data to a current date.

* * * * *